(12) United States Patent
Church, IV et al.

(10) Patent No.: US 11,099,876 B2
(45) Date of Patent: Aug. 24, 2021

(54) SELF-DETERMINATION FOR CANCELLATION OF IN-PROGRESS MEMORY REMOVAL FROM A VIRTUAL MACHINE

(71) Applicant: International Business Machines Corporation, Armonk, NY (US)

(72) Inventors: Walter Church, IV, Binghamton, NY (US); Ronald C. Pierson, Green Cove Springs, FL (US); Thomas Mathias, Vestal, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

(21) Appl. No.: 16/445,278

(22) Filed: Jun. 19, 2019

(65) Prior Publication Data

US 2020/0401433 A1 Dec. 24, 2020

(51) Int. Cl.
*G06F 9/455* (2018.01)
*G06F 12/02* (2006.01)
*G06F 12/0891* (2016.01)

(52) U.S. Cl.
CPC ...... *G06F 9/45558* (2013.01); *G06F 12/0238* (2013.01); *G06F 12/0891* (2013.01); *G06F 2009/45583* (2013.01)

(58) Field of Classification Search
CPC ............ G06F 9/45558; G06F 12/0238; G06F 12/0891; G06F 2009/45583; G06F 12/0253; G06F 2009/4557; G06F 2209/5019; G06F 11/1484; G06F 2201/815; G06F 2212/152
See application file for complete search history.

(56) References Cited

U.S. PATENT DOCUMENTS

| 5,668,944 A * | 9/1997 | Berry ...................... G06F 11/34 |
| | | 714/47.2 |
| 2005/0257020 A1 | 11/2005 | Kashyap et al. |
| 2013/0173805 A1* | 7/2013 | Bohling ................ G06F 9/5016 |
| | | 709/226 |
| 2014/0108764 A1* | 4/2014 | Li .......................... G06F 12/123 |
| | | 711/171 |
| 2014/0258670 A1* | 9/2014 | Venkatasubramanian ................... |
| | | G06F 12/023 |
| | | 711/171 |
| 2015/0161055 A1* | 6/2015 | Deguillard .............. G06F 9/455 |
| | | 711/6 |

(Continued)

*Primary Examiner* — David Yi
*Assistant Examiner* — Tahilba O Puche
(74) *Attorney, Agent, or Firm* — Cantor Colburn LLP; Edward Wixted

(57) ABSTRACT

An aspect of the invention is a method that includes receiving a request from a requestor to reclaim a portion of a memory assigned to a virtual machine (VM). The memory includes real memory that is divided into a plurality of increments. An amount of paging space that will be occupied by the VM subsequent to reclaiming the portion of the memory is predicted. Based on the predicted amount of paging space exceeding a threshold, the requestor is notified that the portion of the memory cannot be reclaimed. Based on the predicted amount of paging space not exceeding the threshold, a reclamation of the portion of the memory is initiated. The reclamation includes vacating an increment of the plurality of increments and removing an assignment of the increment to the VM.

20 Claims, 12 Drawing Sheets

(56) References Cited

U.S. PATENT DOCUMENTS

| | | | |
|---|---|---|---|
| 2015/0293830 A1* | 10/2015 | Bhide | G06F 9/45558 |
| | | | 718/1 |
| 2016/0098207 A1 | 4/2016 | Guo | |
| 2017/0147227 A1* | 5/2017 | Stabrawa | G06F 3/0631 |
| 2018/0150327 A1 | 5/2018 | Tsirkin | |
| 2019/0034095 A1 | 1/2019 | Singh et al. | |
| 2019/0286465 A1* | 9/2019 | Cui | G06F 9/5016 |
| 2019/0370043 A1* | 12/2019 | Olderdissen | G06F 3/0673 |
| 2020/0097197 A1* | 3/2020 | Gandhi | G06F 11/3034 |
| 2020/0241902 A1* | 7/2020 | Freche | G06F 12/1009 |

\* cited by examiner

US 11,099,876 B2

SELF-DETERMINATION FOR CANCELLATION OF IN-PROGRESS MEMORY REMOVAL FROM A VIRTUAL MACHINE

BACKGROUND

The present invention generally relates to virtual machines (VMs), and more specifically, to self-determination for cancellation of an in-progress memory removal from a VM.

Many computer systems provide for partitioning. Partitioning, which is most typically implemented in server systems, divides the available system resources into logically partitioned groups. In particular, memory devices, processors, and input/output (I/O) devices are logically partitioned into independent, secure groups of resources. An independent operating system (OS) image typically runs on each partition, or VM, allowing for multiple OSs to concurrently execute on a computer system, and allowing each VM to function independently of other VMs executing on the computer system.

SUMMARY

According to one or more embodiments of the present invention a non-limiting example computer-implemented method includes receiving a request from a requestor to reclaim a portion of a memory assigned to a virtual machine (VM). The memory includes real memory that is divided into a plurality of increments. An amount of paging space that will be occupied by the VM subsequent to reclaiming the portion of the memory is predicted. Based on the predicted amount of paging space exceeding a threshold, the requestor is notified that the portion of the memory cannot be reclaimed. Based on the predicted amount of paging space not exceeding the threshold, a reclamation of the portion of the memory is initiated. The reclamation includes vacating an increment of the plurality of increments and removing an assignment of the increment to the VM.

Other embodiments of the present invention implement the features of the above-described methods in computer systems and in computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
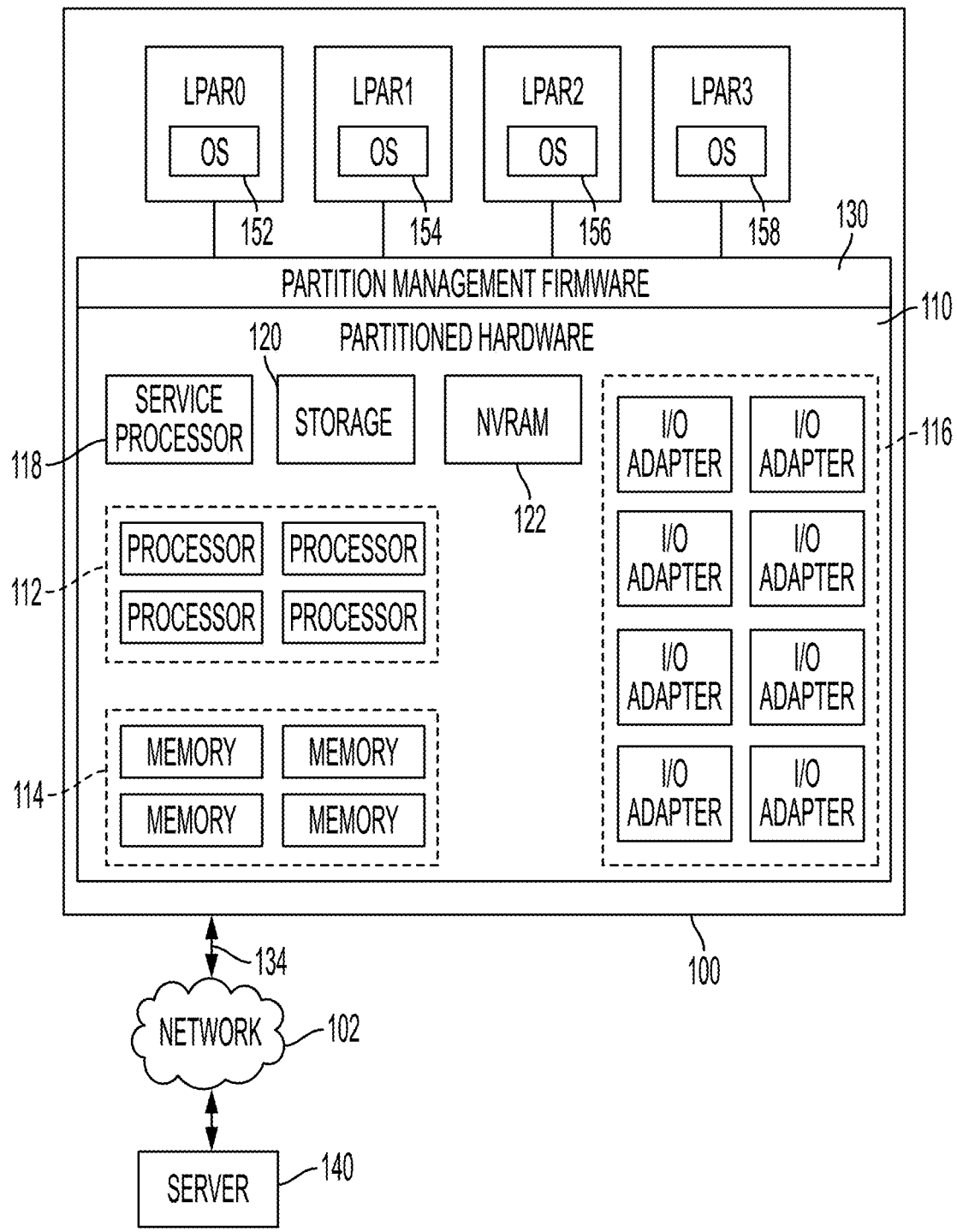
FIG. 1 is a block diagram of a logically partitioned data processing system in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a memory reclamation command that allows the issuer of the command to specify a maximum amount of paging space can be used before the system halts the reclamation. This allows a user to set a page warning threshold that is customized to a particular workload. A memory reclamation command allows a user, such as a system administrator, to dynamically change the memory configuration of a virtual machine (VM) by removing real memory from the VM without requiring a re-initial program load (IPL) of the VM. In accordance with one or more embodiments of the present invention, the memory reclamation command represents a compact between the system administrator and a partition manager, such as a hypervisor. The system administrator knows and specifies the level of paging that is acceptable for the workload that the memory is being reclaimed from, and the hypervisor ensures that the reclamation process does not exceed that level. In accordance with one or more embodiments of the present invention, the memory reclamation process is continuously monitored, and if it is determined that the amount of memory to be removed from a VM will cause paging to go over the specified limit, the memory reclamation process is halted and a message is sent to the user.

One or more embodiments of the present invention provide a new memory reclamation command that has an optional parameter to indicate a maximum percentage of the page space that can contain content ("MaxPageFull"). The MaxPageFull parameter can have a value from zero to one-hundred, and if no value is provided the MaxPageFull parameter is set to a default value (e.g., ninety, seventy-five, etc.).

Throughout the memory reclamation process the vacator process performs viability checks to predict if the amount of memory being removed will exceed the specified paging percentage. In accordance with one or more embodiments of the present invention, the viability check is done by calculating the number of frames that are available across all the memory zones and subtracting that from the number of frames for the zones that are being removed. The result is how many frames could potentially be paged out. The amount of frames that are available is found by adding together the different counts of available frames within the zone across every zone in the system (e.g., the VM). If the number of frames to remove is greater than the number of frames available, then the number of paging slots in the paging space that would be filled is checked. Otherwise, there is enough room in the system and no paging should happen so the reclamation continues.

In accordance with one or more embodiments of the present invention, in the case where paging will occur, the number of frames that will need to be paged out (frames to remove−frames available) is added to how many paging slots are already in use and divided by the total number of paging slots to determine what the potential paging percent could become. If this percentage value is greater than MaxPageFull, then the viability test indicates to the vacator process that the viability test has failed. The vacator process on seeing the failed viability test sets the failure code and proceeds to stop the reclamation (e.g., by setting bits to indicate that the reclamation has failed) which prevents the reclamation from continuing and initiates the end procedures for a reclamation.

One or more embodiments of the present invention provide dynamic storage reconfiguration (DSR) which is the ability of a partition manager to increase or decrease the amount of memory utilized by an executing VM. Storage must be added or removed from the VMs in multiples of the storage increment size. Each increment of storage contains multiple frames of memory, with each frame storing a page of memory. In accordance with one or more embodiments each page is four kilobytes (4K) in size and each storage increment is two gigabytes (2 GB) in size. One skilled in the art will recognize that other sizes of pages and storage increments (also referred to herein as memory increments) can be implemented by one or more embodiments of the present invention. The storage increment size is typically fixed and determined by the hardware. As used herein, the terms "memory reclamation" or "reclaiming memory" refers to the process of removing some storage (in units of increments) from one VM and putting it back into standby storage where it can be used by another VM. The terms "VM" and "LPAR" are used interchangeably herein to refer to a logical partition being managed by a partition manager.

In accordance with one or more embodiments of the present invention, a portion of the memory allocated to a VM is permanent VM storage, that is, storage that cannot be removed from the VM by memory reclamation. The permanent storage can be used, for example, for processor control structures and pages that might be locked long term. One or more embodiments of the present invention allow the permanent VM storage to be supplemented with reconfigurable storage that can be added and removed by memory reclamation. Reconfigurable storage can be used by a VM, for situations such as, but not limited to: extra workload that happens during special events or at certain times; workload that does not always run on the VM; and workload that is growing and might need its own VM in the future. One or more embodiments of the present invention can be utilized in environments where memory is categorized as permanent storage and reconfigurable storage. One or more embodiments of the present invention can also be utilized in environments where the data is not categorized in this manner.

As known in the art, a partition manager, such as a hypervisor, is implemented by computer software, firmware, and/or hardware and can create and run VMs. A hypervisor is typically allocated an amount of real memory (also referred to herein as "storage") available for allocation to the VMs. At least a portion of the memory (e.g., the reconfigurable memory increments) can be added and removed from each VM dynamically while the system is running. Before the memory can be removed from a VM, its contents must be moved elsewhere, either to other memory increments and/or to paging disks. This process of moving the contents of a memory increment from one storage location to another is referred to herein as "vacating memory." After the memory is vacated, the hypervisor can remove the memory from the VM and return it to a pool of storage that is available for other uses (e.g., reconfigurable storage). As described previously, in contemporary systems the removal of the memory, or memory reclamation, must be performed on set memory sizes, referred to herein as an "increment sizes." An example of a contemporary system that currently requires removal of memory in set memory increment sizes includes, but is not limited to IBM Z®, where the increment size is a function of the hardware level and logical partition (LPAR) memory size.

As known in the art, if there are more guests logged on that require more virtual memory than that of the systems real memory, then an over-commitment of memory will happen and some of the memory will be paged out. Any contemporary method of paging can be used by one or more embodiments of the present invention. Paging typically involves a number of system components to handle the movement of pages and several additional tables to keep track of the most current version of each page. For example, dynamic address translation (DAT) hardware as well as segment and page tables that support address translation can be used. Paging space is assigned to a VM by the system administrator either while configuring the system prior to IPLing or after IPL via privileged commands.

DSR can be used, for example, in a cloud environment where workloads on the system can spike and more memory may be needed and added to the system (e.g., a VM). After the workload ebbs and the system no longer needs as much memory it is beneficial for the added memory to be removed. This allows a system operator to move memory across systems without requiring a system outage or IPL of the VM. Before a memory increment can be reclaimed, contents of the memory increment being reclaimed are removed and moved to another memory increment or to a paging space using a vacate process. During a memory reclamation, the amount of real memory being removed may be too much for the rest of the system to contain. If too much memory is removed, the VM fill up the rest of the real memory increments and a portion of the paging space. If the paging space becomes full a system outage will occur.

Due to the speed of the system, as part of the reclamation process, moving pages out of memory increments that will be removed and into available (or free) space, the paging space can become nearly full before it is visible to the system operator. At that point, it may already be too late for the system operator to attempt to stop the memory reclamation. There could also be active guests, or VMs, that are experiencing a spike in their workload while memory reclamation is in process. Spikes in workload can cause more memory to be used and make less space available which could lead to the paging space filling up even more quickly.

Turning now to FIG. 1, a block diagram of a logically partitioned data processing system is generally shown in accordance with one or more embodiments of the present invention. Data processing system 100 includes partitioned hardware 110. Partitioned hardware 110 includes the hardware components of data processing system 100 that can be allocated into LPARs and managed by partition management firmware 130 (e.g., a hypervisor). For purposes of example, data processing system 100 is described with reference to the partitioned hardware, rather than a schematic showing how components of the hardware are interconnected. It will be understood, however, that the hardware components within partitioned hardware 110 of data processing system 100 are connected by multiple buses or other communication devices for communicating information within data processing system 100. The buses, for example, may include low-latency and higher latency paths connected by bridges and adapters and controlled by multiple controllers (not depicted). Further, it will be understood that in addition to the components illustrated in data processing system 100, additional components may be implemented within data processing system 100.

Within partitioned hardware 110, multiple hardware components include processors 112, storage 120, memory units 114, and I/O adapters 116. Processors 112 may be general-purpose processors, such as, but not limited to, IBM's PowerPC™ or IBM Z® processors that, during normal operation, process data under the control of operating system (OS) and application software accessible from a dynamic storage device such as random access memory (RAM) and a static storage device such as read only memory (ROM) built-in with each processor. In addition, memory units 114 may include multiple types of volatile and non-volatile memory which are partitioned and accessible to the processors 112.

In one example, memory units 114 may include on-demand memory that is activated and allocated only when needed by data processing system 100. In addition, in one example, on-demand memory from other server systems via a network such as network 102 or cloud may be made available to the LPARs of FIG. 1.

In the embodiment shown in FIG. 1, data processing system 100 includes four logical partitions (LPARs), where each LPAR, or VM, includes a portion of available processors 112, I/O adapters 116, and memory units 114. A separate OS instance executes within each LPAR. For example, OS 152 operates in LPAR0, OS 154 operates in LPAR1, OS 156 operates in LPAR 2, and OS 158 operates in LPAR3. It will be understood that while data processing system 100 is defined to include four LPARs, resources are not automatically allocated for four LPARs. Further, it will be understood that any number of LPARs may be defined for a data processing system depending on the amount of resources available in the data processing system and the minimum required resource allocation for an LPAR. In particular, configurable determinations can be made for different partition implementations.

In one example of the implementation of a partition management layer, NVRAM 122 may store a table identifying resource allocation among the LPARs. Partition management firmware 130, executing on service processor 118, accesses the table from NVRAM to provide for memory mapping and other partition security measures.

In accordance with one or more embodiments of the present invention, computer instructions to execute the selection, vacating, and reclamation processes are located in the partition management firmware 130. It will be understood that partition management firmware 130 may be implemented using a hypervisor or other middleware enabled to allocate and control partitions within a data processing system.

Figure 4:
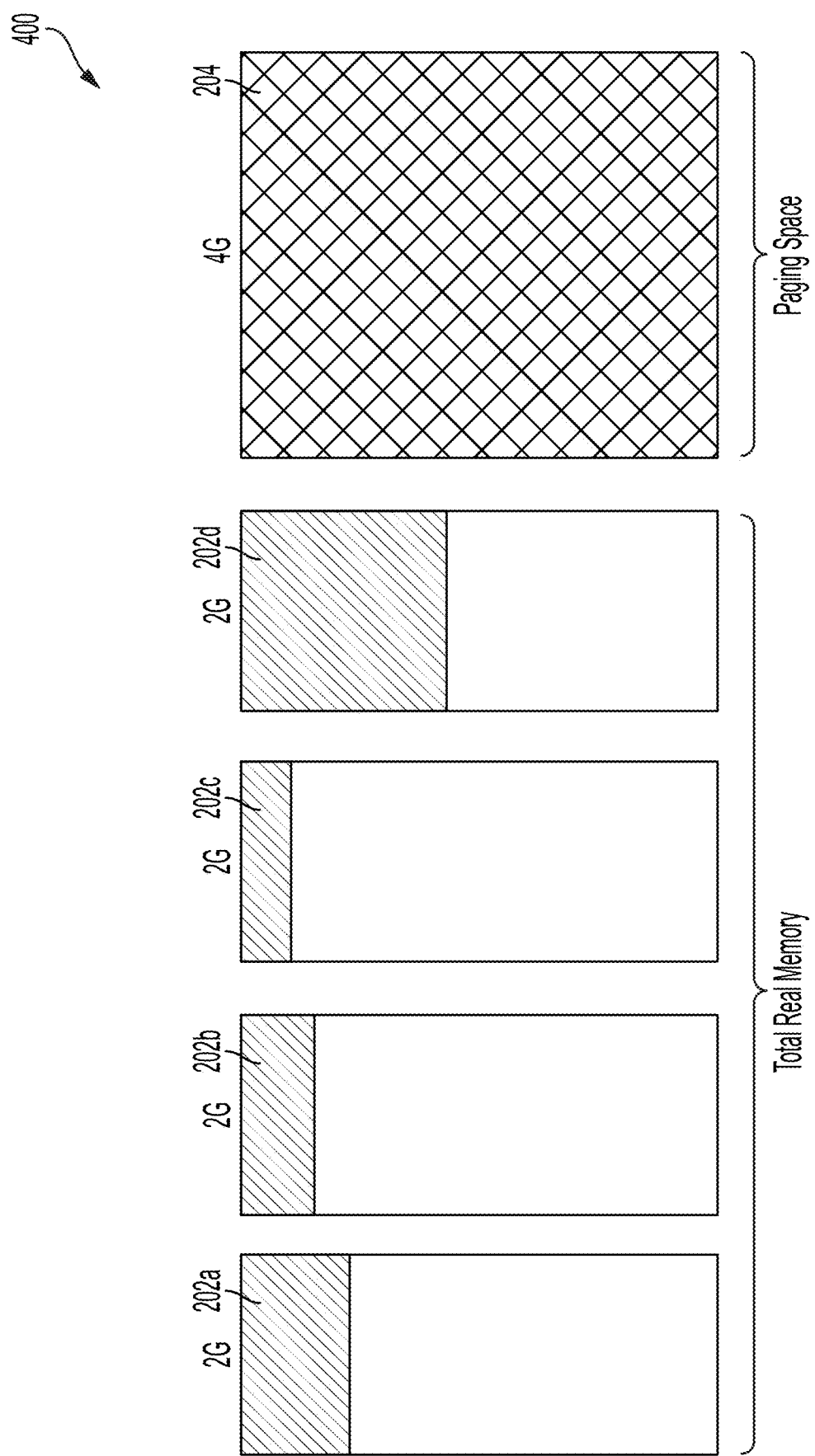
FIG. 4 is a block diagram of memory increments and paging space of a VM in accordance with one or more embodiments of the present invention.

In one embodiment, the OSs or application software within each LPAR and partition management firmware 130 contain machine executable instructions that when executed on processors 112 or service processor 118 carry out the operations depicted in the flowchart of FIG. 4 and other operations described herein. Alternatively, the operations performed by one or more embodiments of the present invention can be performed by specific hardware components that contain hardwired logic for performing the steps, or by any combination of programmed computer components and custom hardware components.

One or more embodiments of the present invention may be downloaded as a computer program product, where the program instructions may be transferred from a remote computer such as a server 140 to requesting data processing system 100 by way of data signals embodied in a carrier wave or other propagation medium via a network link 134 (e.g. a modem or network connection) to a communications interface of data processing system 100. The communications interface provides a two-way data communications coupling to network link 134 that may be connected, for example, to a local area network (LAN), wide area network (WAN), directly to an Internet Service Provider (ISP), or to the cloud. In particular, network link 134 may provide wired and/or wireless network communications to one or more networks or clouds.

Network link 134 in turn provides data communication services through network 102. Network 102 may refer to the worldwide collection of networks and gateways (e.g., the Internet or a cloud) that use a particular protocol, such as transmission control protocol (TCP) and Internet protocol (IP), to communicate with one another. Alternatively, network 102 may refer to a local network, a private network, or other networks created for the distribution of information and computing resources, such as a grid computing network. Network link 134 and network 102 both use electrical, electromagnetic, or optical signals that carry digital data streams. The signals through the various networks and the signals on network link 134 and through the communication interface, which carry the digital data to and from data processing system 100, are exemplary forms of carrier waves transporting the information.

In one or more embodiments of the present invention, in addition to server 140 providing a computer program product, server 140 may enable a remote management interface for a system administrator or remote manager to direct dynamic reconfiguration commands (e.g., a reclamation command) to partition management firmware 130 via network 102. In particular, when a system administrator or remote manager chooses to explicitly direct dynamic reconfiguration, partition management firmware 130 receives commands to allocate or deallocate resources to partitions and adjusts the allocation of resources according to the commands.

Figure 2:
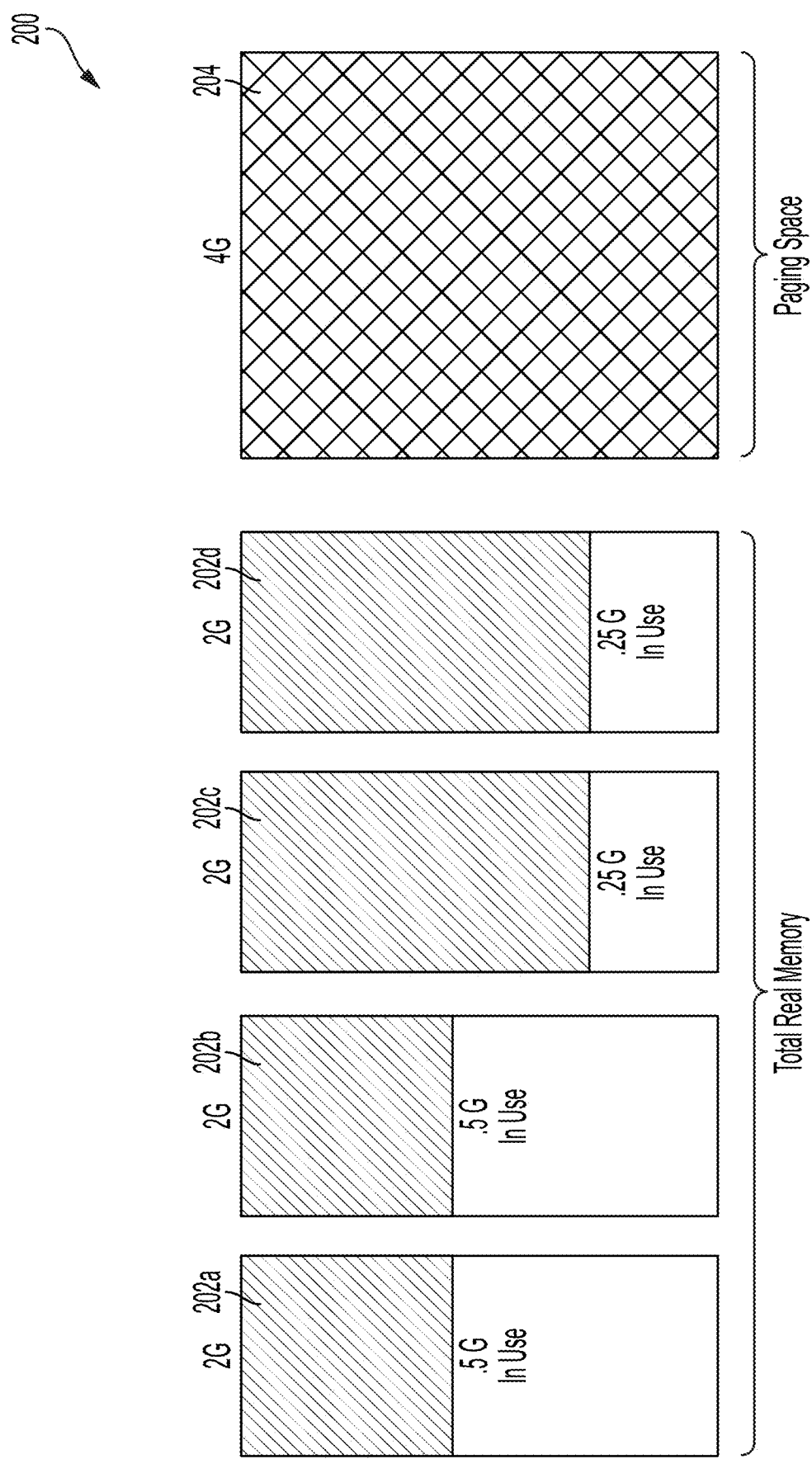
FIG. 2 is a block diagram of memory increments and paging space of a virtual machine (VM) in accordance with one or more embodiments of the present invention.

Turning now to FIG. 2, a block diagram 200 of memory increments and a paging space of a VM is generally shown in accordance with one or more embodiments of the present invention. As shown in FIG. 2, the real memory assigned to the VM is divided up into memory increments. FIG. 2 includes four two gigabyte (2 G) memory increments: 202a, 202b. 202c, and 202d, referred to collectively herein as memory increments 202. The memory increments 202 represent the total real memory assigned to the VM. Only four memory increments are shown in FIG. 2 for ease of description, however embodiments are not limited to four memory increments, as a typical VM may have hundreds or thousands of assigned memory increments at any given point in time. At the point in time depicted in FIG. 2, memory increments 202a and 202b each have 0.5 gigabytes (0.5 G) in use and 1.5 G of free space, and memory increments 202c and 202d each have 0.25 G in use and 1.75 G of free space. Also shown in FIG. 2 is 4 G of paging space 204 available to the VM. At the point in time shown in FIG. 2, the paging space is zero percent full and the entire 4 G of paging space is available to the VM.

Figure 3:
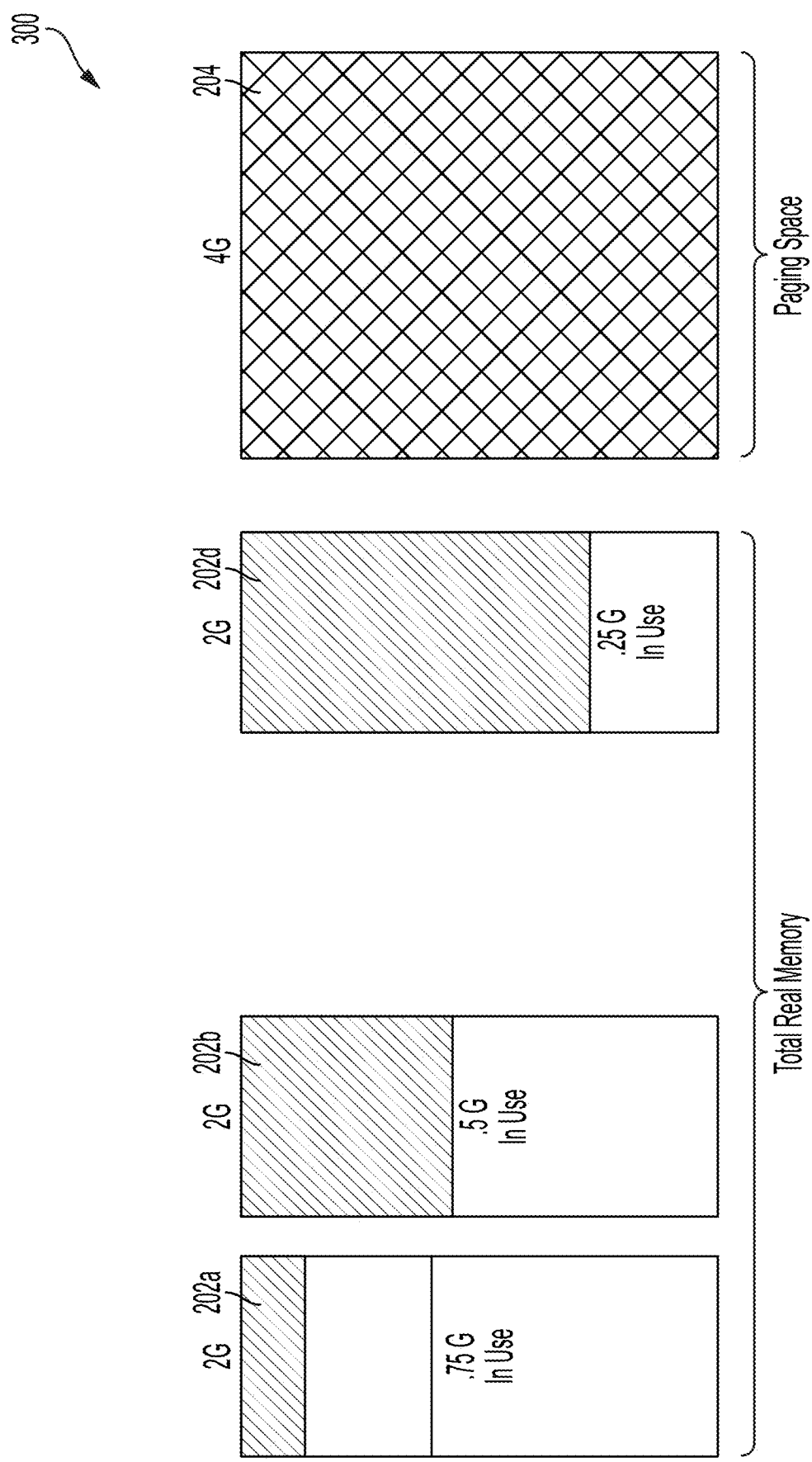
FIG. 3 is a block diagram of the memory increments and paging space of FIG. 2 after a memory increment has been reclaimed in accordance with one or more embodiments of the present invention.

Turning now to FIG. 3, a block diagram 300 of the memory increments and paging space of FIG. 2 after memory increment 202c has been reclaimed is generally shown in accordance with one or more embodiments of the present invention. Before memory increment 202c was reclaimed, a vacate process moved the contents of memory increment 202c to memory increment 202a. Memory increment 202a now has 0.75 G in use. No paging takes place in the example shown in FIG. 3 because there was enough free space in the remaining memory increments to store the contents of memory increment 202c.

Turning now to FIG. 4, a block diagram 400 of memory increments and paging space of a VM is generally shown in accordance with one or more embodiments of the present invention. As shown in FIG. 4, the memory increments 202 have a small amount of free space because much more of the real memory is in use. In addition, FIG. 4 shows paging space 204 which does not have any contents (i.e., the percentage of paging is zero percent).

Figure 5:
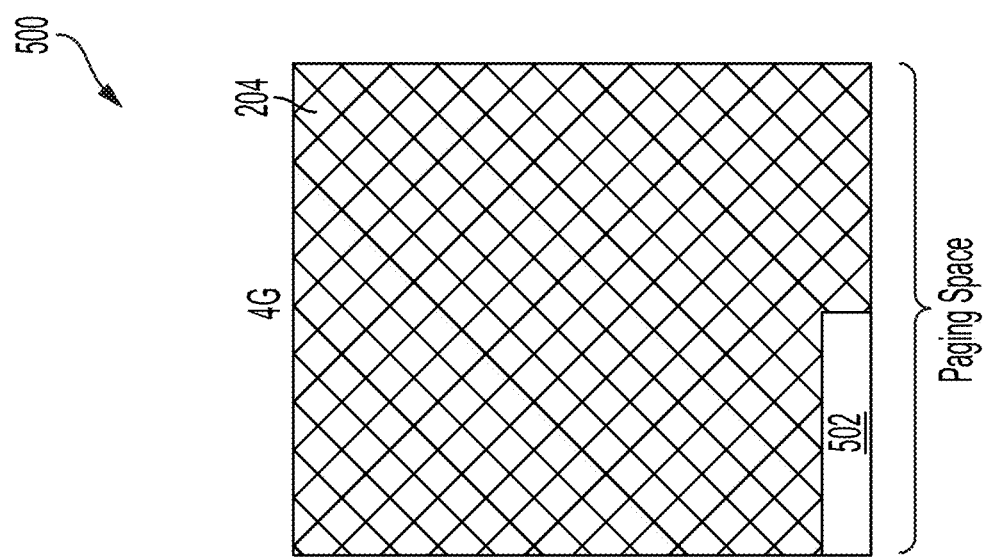
FIG. 5 is a block diagram of the memory increments and paging space of FIG. 4 after a memory increment has been reclaimed in accordance with one or more embodiments of the present invention.
Figure 5:
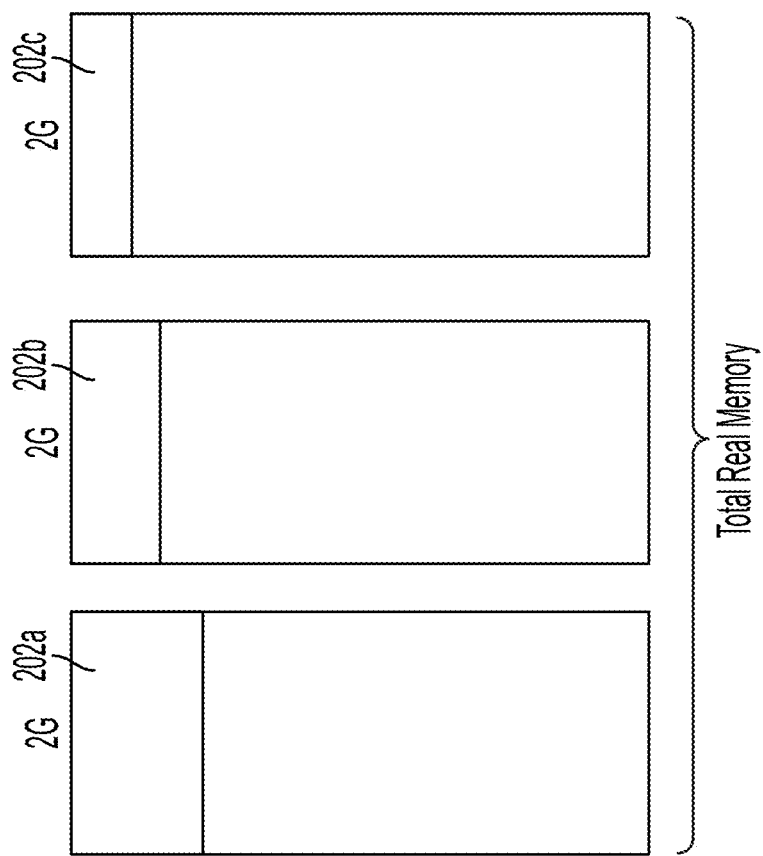

Turning now to FIG. 5, a block diagram 500 of the memory increments and paging space of FIG. 4 after memory increment 202d has been reclaimed is generally shown in accordance with one or more embodiments of the present invention. As shown in FIG. 5, as pa of the vacate process, portions of the contents of memory increment 202d were moved to memory increments 202a. 202b, and 202c. In addition, the portion 502 of the contents of memory increment 202d that did not fit in memory increments 202a. 202b, and 202c was stored in the paging space 204.

Figure 6:
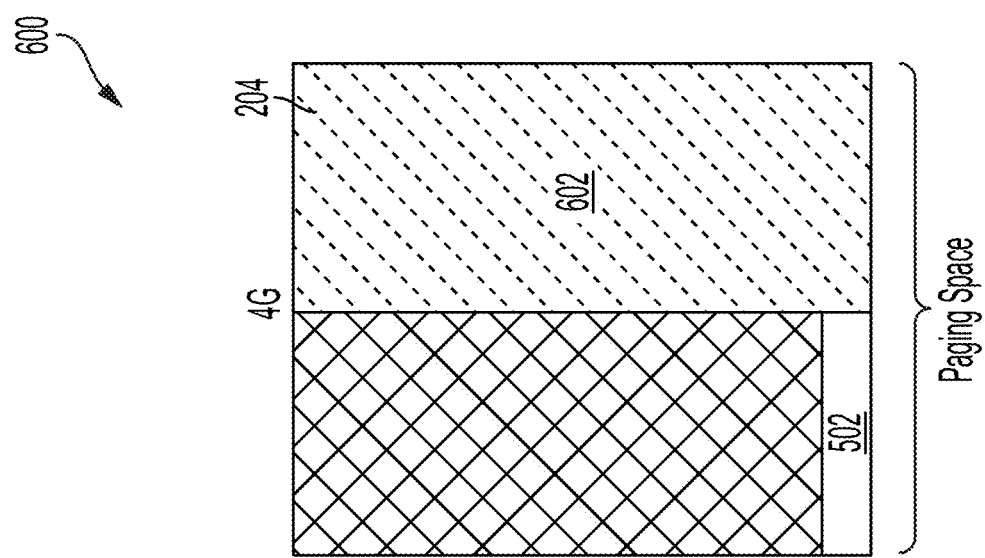
FIG. 6 is a block diagram of the predicted usage of paging space of FIG. 5 if another memory increment is reclaimed in accordance with one or more embodiments of the present invention.
Figure 6:
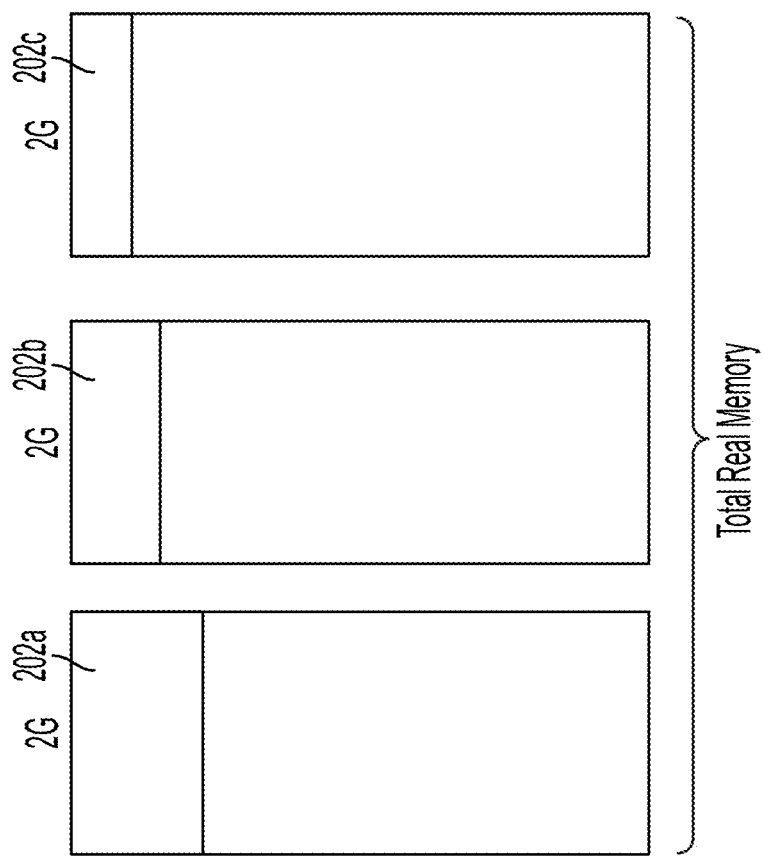

Turning now to FIG. 6, a block diagram 600 of the predicted usage of paging space of FIG. 5 if another memory increment is reclaimed is generally shown in accordance with one or more embodiments of the present invention. In the example shown in FIG. 6 the maximum paging percentage is fifty percent (e.g., the MaxPageFull parameter is set to fifty). As shown in FIG. 6, if storage reclamation is issued for a memory increment 202 and the maximum amount of paging space 204 that can be utilized is set to fifty percent, then reclaiming another memory increment 202 will not be initiated. This is because performing the reclamation would cause more than fifty percent of the paging space 204 to be utilized. As shown in FIG. 6, the vacated contents 602 would all be stored in the paging space 204.

In accordance with one or more embodiments of the present invention, the predicting includes selecting a memory increment for removal and calculating the number of frames that are available (those that currently have no content) on the other memory increments 202. The amount, or number of frames, occupied (those with content) in the selected memory increment is compared to the number of available frames. If the number of frames occupied is greater than the number of frames available, paging will occur. In the case where paging will occur, the number of frames that will be paged out (the number of frames occupied in the selected memory increment minus the number of available frames) is added to how many paging slots are already in use. This number is divided by the total number of paging slots to determine the predicted paging percentage.

Figure 7:
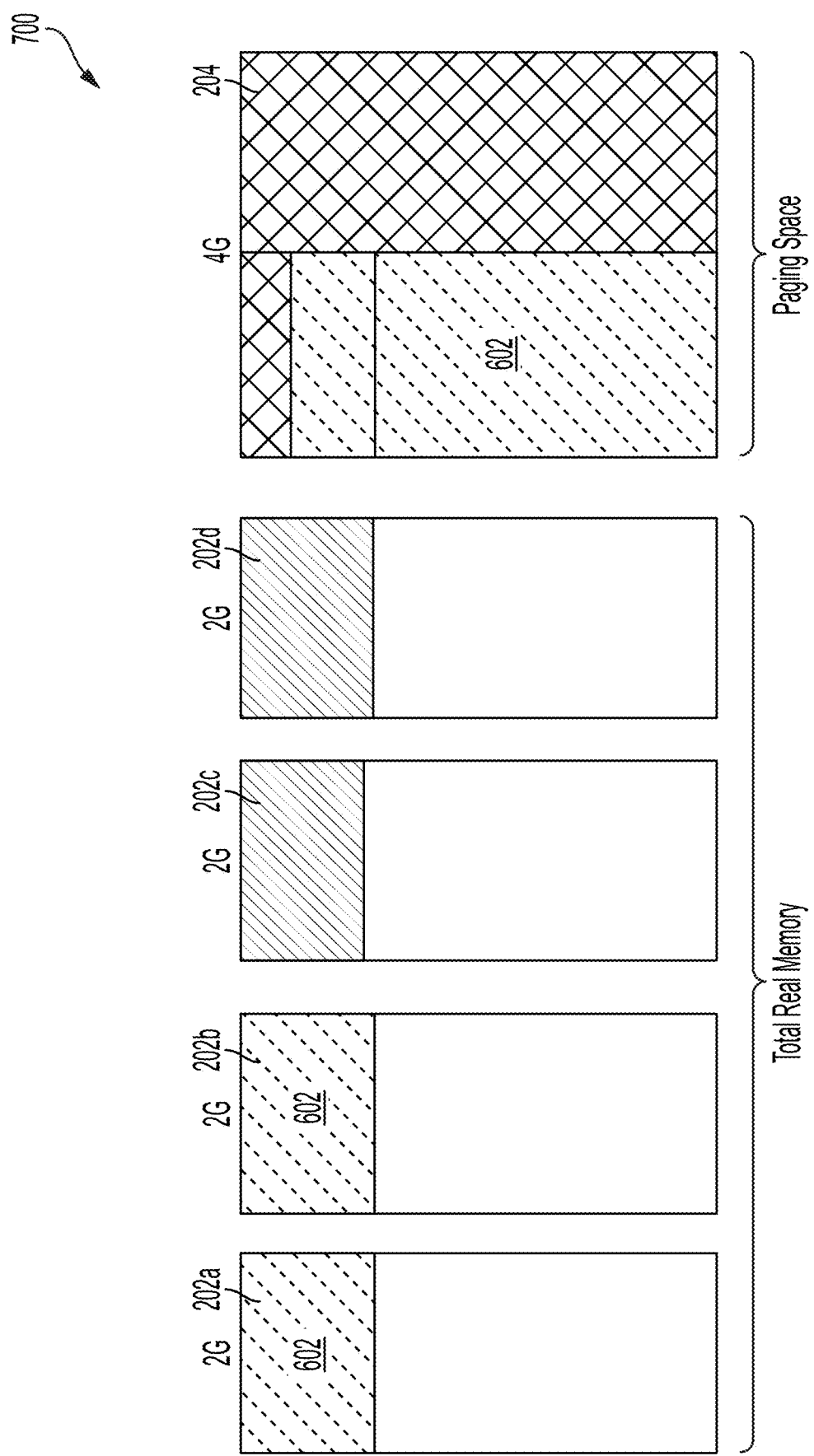
FIG. 7 is a block diagram of the predicted usage of memory increments and paging space if two memory increments are reclaimed in accordance with one or more embodiments of the present invention.

Turning now to FIG. 7, a block diagram 700 of the predicted usage of memory increments and paging space if two memory increments 202 are reclaimed is generally shown in accordance with one or more embodiments of the present invention. As shown in FIG. 7, it is predicted that if memory increments 202c and 202d are reclaimed, that the vacated contents 602 would fill up memory increments 202a and 202b, and fill a portion of the paging space 204. The predicted portion of the paging space 204 in the example shown in FIG. 7 is less than fifty percent and if the maximum paging percentage is fifty percent, the reclamation process can be initiated to remove two increments 202.

Figure 8:
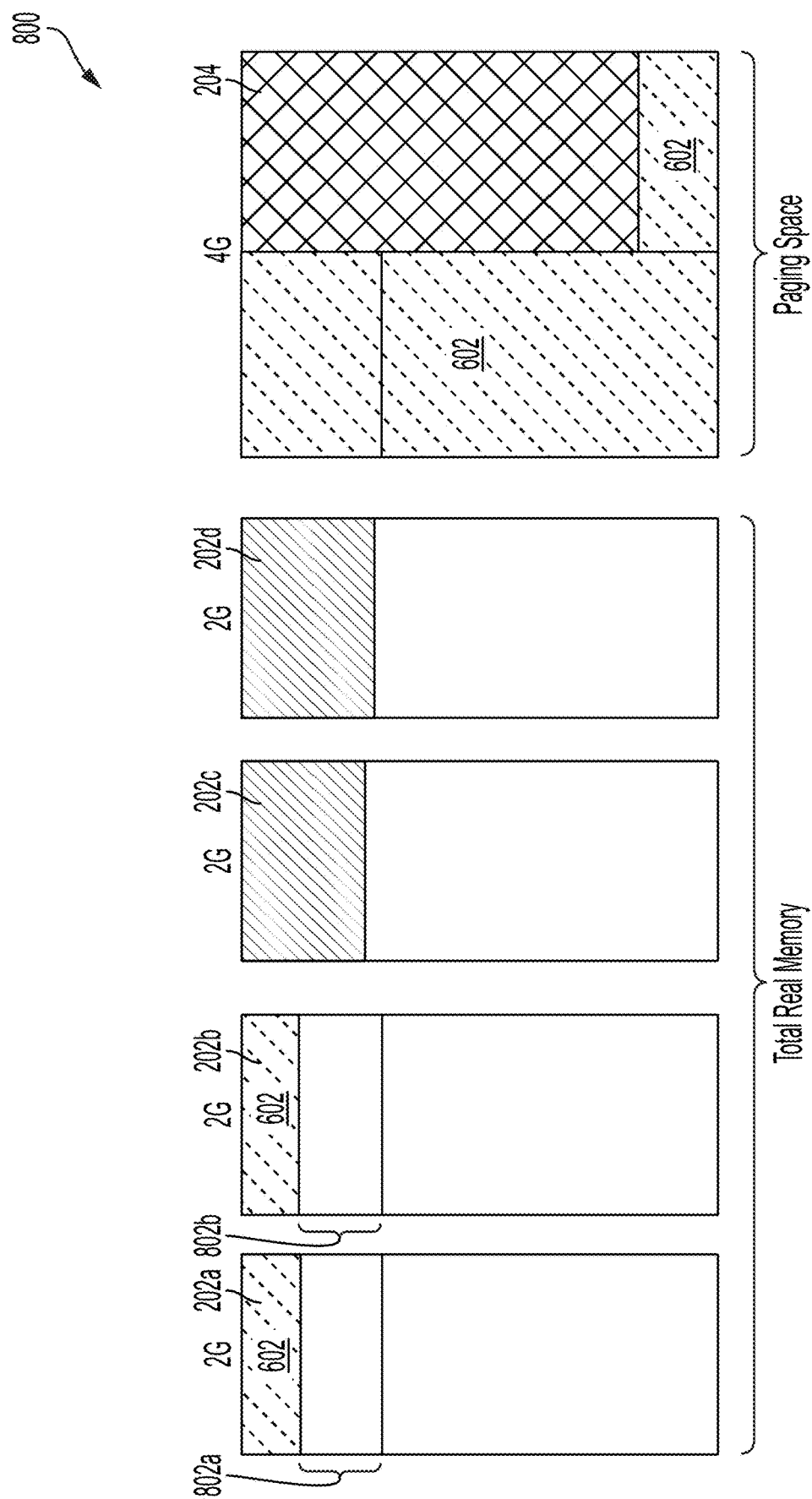
FIG. 8 is a block diagram of the predicted usage of memory increments and paging space of FIG. 7 when the workload spikes during a reclamation process of two memory increments in accordance with one or more embodiments of the present invention.

Turning now to FIG. 8, a block diagram 800 of the predicted usage of memory increments and paging space of FIG. 7 when the workload spikes during the reclamation process is generally shown in accordance with one or more embodiments of the present invention. As shown in FIG. 8, additional content 802a has been added to memory increment 202a and additional content 802b has been added to memory increment 202b, due for example to an increased workload in the VM. As shown in FIG. 8, an updated prediction is that more than fifty percent of the paging space 204 will be occupied if both the memory increments 202c and 202d are reclaimed. Based on the updated prediction and the value of the MaxPageFull parameter, the reclamation is halted. At the time that the reclamation is halted, a portion of the content from memory increments 202c and 202d may have already been moved to memory increment 202a, memory increment 202b, and/or paging space 204.

Figure 9:
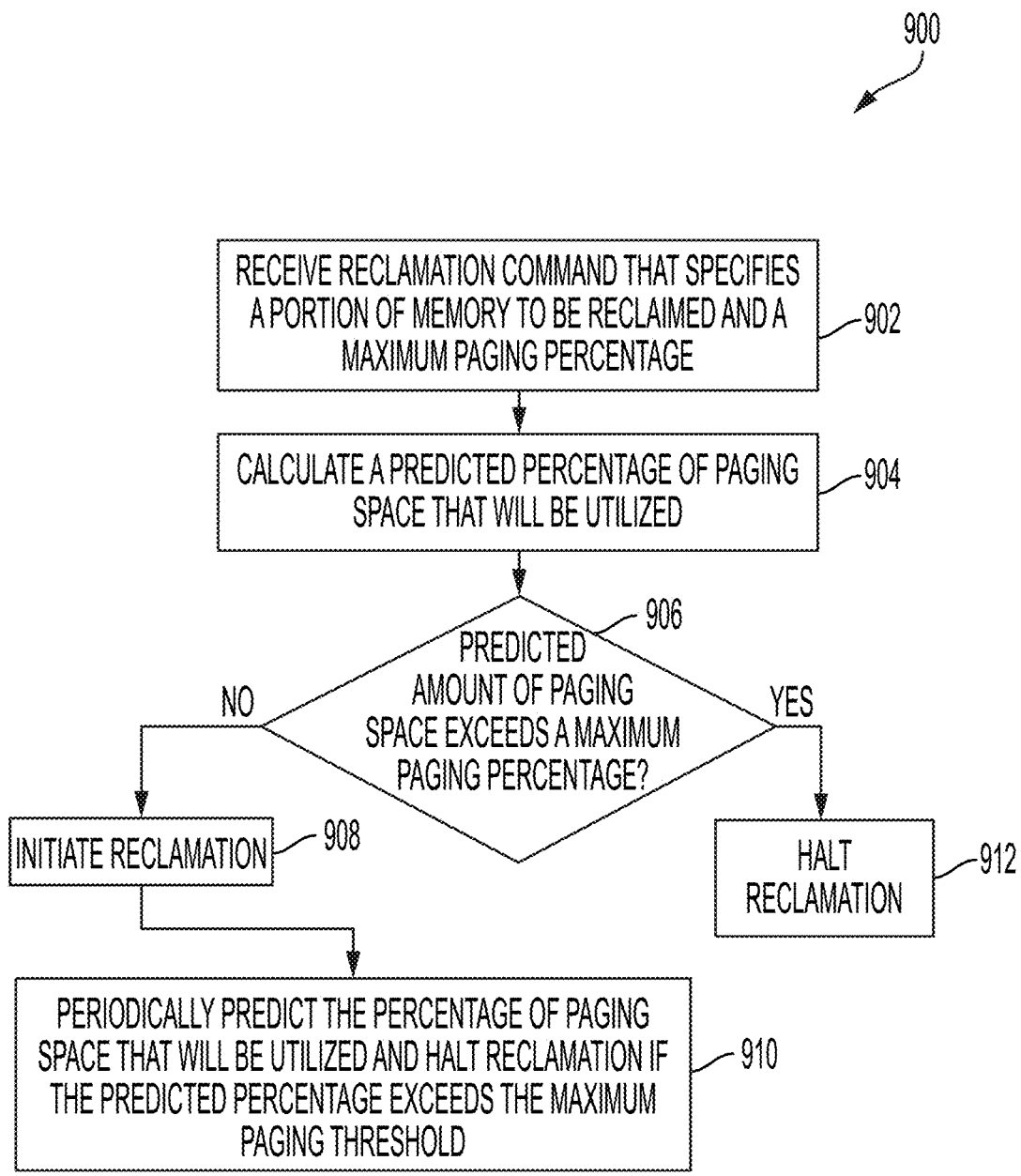
FIG. 9 is a flow diagram of a process for self-determination for cancellation of in-progress memory removal in a VM in accordance with one or more embodiments of the present invention.

Turning now to FIG. 9, a flow diagram 900 of a process for self-determination of in-progress memory removal cancellation is generally shown in accordance with one or more embodiments of the present invention. The process shown in FIG. 9 can be performed, for example by partition management firmware executing on a processor. The process shown in FIG. 9 can be initiated by a system operator or system administrator sending a reclamation command to the partition management firmware indicating a maximum paging percentage and a portion of the memory assigned to the VM to be reclaimed. Processing beings at block 902, with receiving a reclamation command that specifies an amount of memory to be reclaimed. The reclamation command can also specify a threshold, such as a maximum paging percentage (e.g., MaxPageFull parameter). At block 904, a predicted percentage of paging space that will be utilized if the reclamation is performed is calculated.

It is determined, at block 906, whether the amount of paging space predicted to be utilized exceeds the maximum paging percentage. If the amount of paging space is predicted to exceed the maximum paging percentage, then processing continues at block 912 where the reclamation process is halted. In addition, a notification can be sent to the requestor indicating that the amount of memory requested to be reclaimed cannot be reclaimed.

If it is determined, at block 906, that the predicted amount of paging space does not exceed the maximum paging percentage, then processing continues at block 908, where the reclamation process is initiated. While the reclamation process is executing, block 910 is performed to periodically predict, based on a current state of the VM, the percentage of paging space that will be utilized by the reclamation process and halting the reclamation process if it exceeds the maximum paging percentage.

In accordance with one or more embodiment of the present invention, an absolute paging rate (e.g., a current paging rate) and/or a rate of increase in the predicted percentage of paging space that will be utilized by the reclamation process is utilized to determine whether to halt the reclamation process. For example, if the predicted use of the paging space increases at a selected rate (e.g., 1.5 times greater between predictions, 2 times greater over a specified time period, etc.) between predictions or over a selected time period(s), the reclamation process may be halted. The rate of increase can be utilized in conjunction with the amount of free space existing in the paging space. For example, a rate of increase of a first specified amount (e.g., 2 times more paging space predicted to be utilized in a present prediction compared to a previous prediction) in combination with the paging space being a second specified amount occupied (e.g., thirty percent full) may cause the reclamation process to be halted.

Additional factors can be used alone or in combination with the paging rate, the rate of increase of the paging rate, and the amount of free space in the paging space to determine when to halt the reclamation process. In one or more embodiments of the present invention, the reclamation process can be halted if the paging rate exceeds a specified percentage of a maximum paging rate for the system or if the paging rate exceeds a specified paging rate. For example, a halt of the reclamation process may occur if the specified amount of the paging space is occupied (e.g., forty percent full) or if the paging rate is more than a specified rate. In another example, the reclamation process is halted if the specified amount of the paging space is occupied (e.g. twenty five percent full) or the paging rate is more than a specified percentage (e.g., sixty percent) of the maximum paging rate or more than a specified multiple (e.g., twice) greater than a predicted increase in paging rate.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
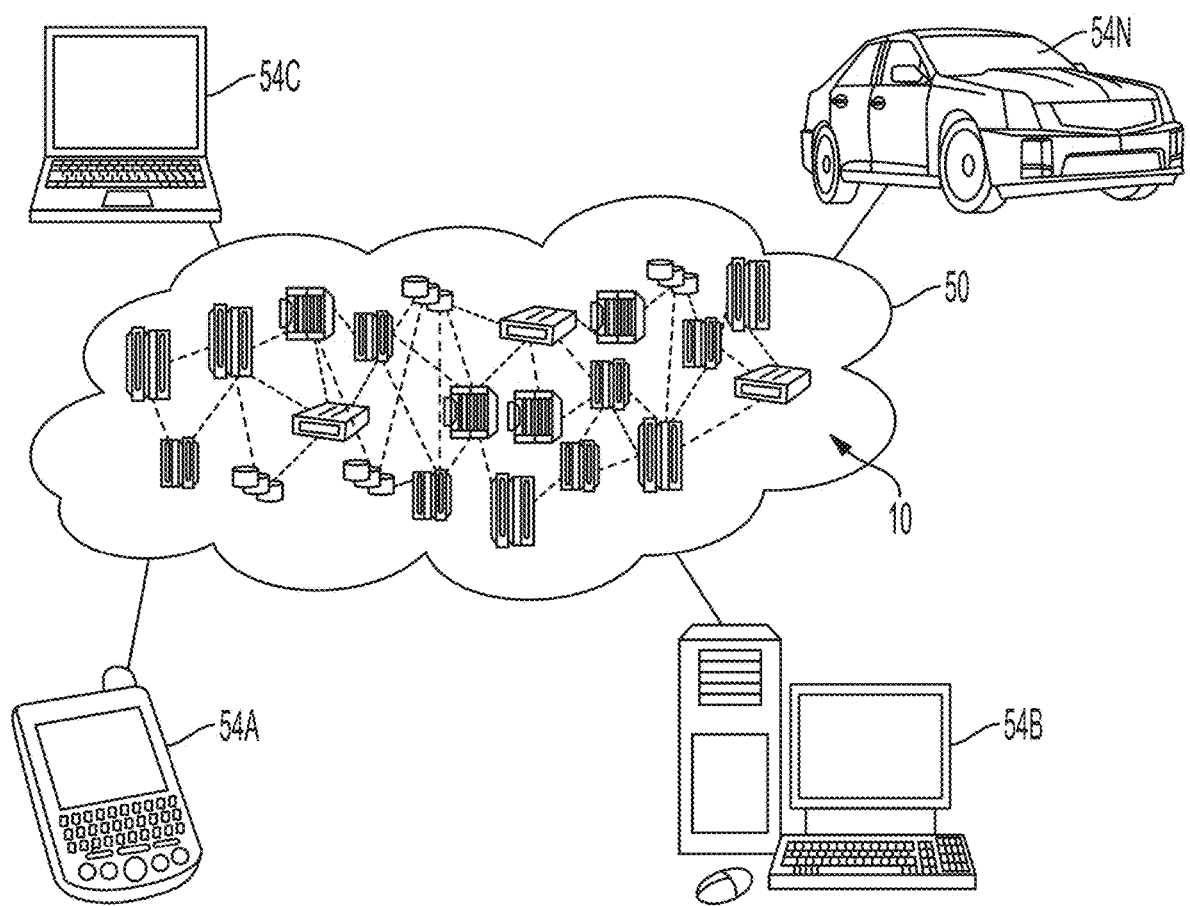
FIG. 10 depicts a cloud computing environment according to one or more embodiments of the present invention.

Referring now to FIG. 10, illustrative cloud computing environment is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
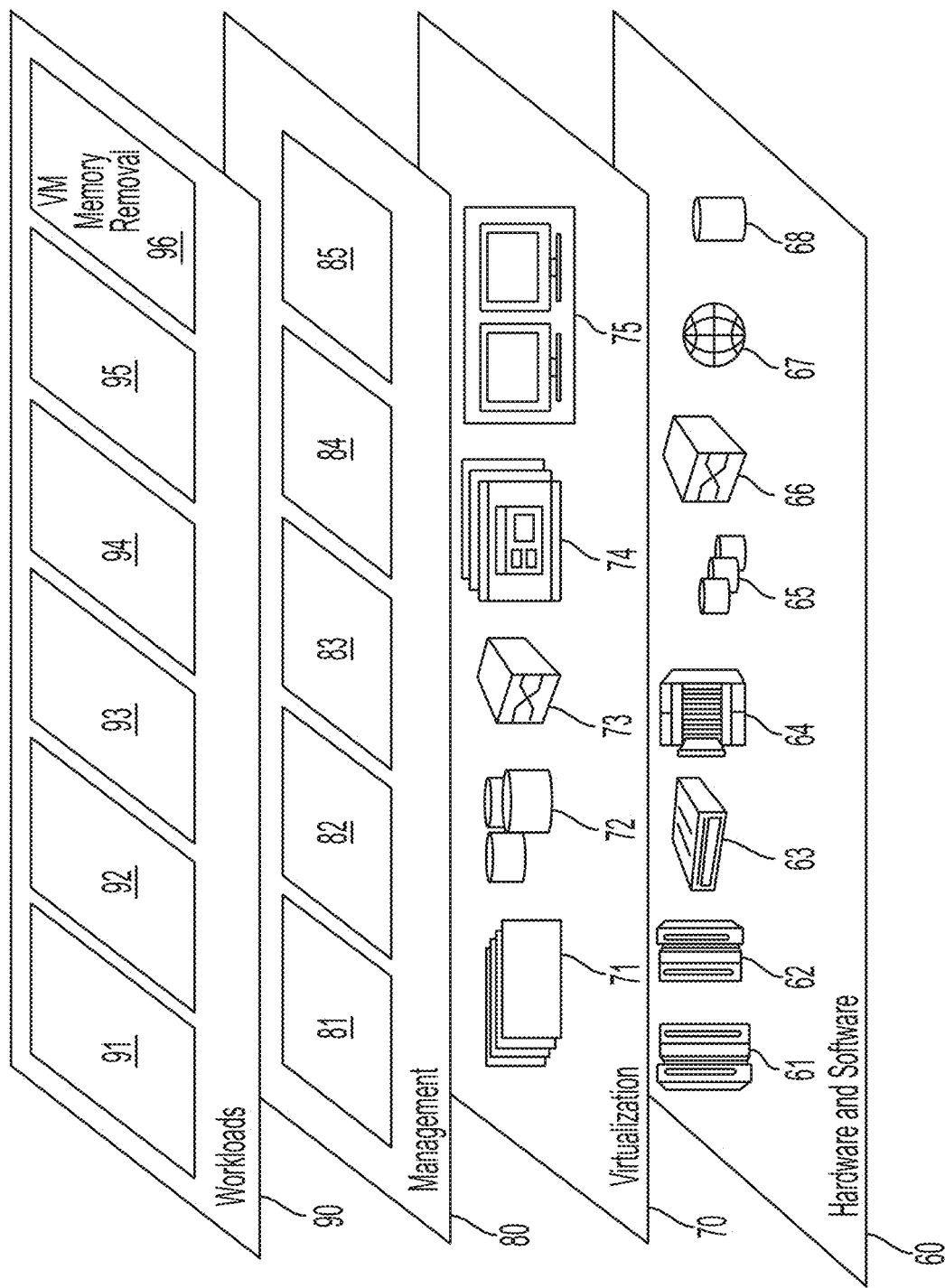
FIG. 11 depicts abstraction model layers according to one or more embodiments of the present invention.

Referring now to FIG. 11 a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, for example, software components include network application server software 67, database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and VM memory removal 96.

Figure 12:
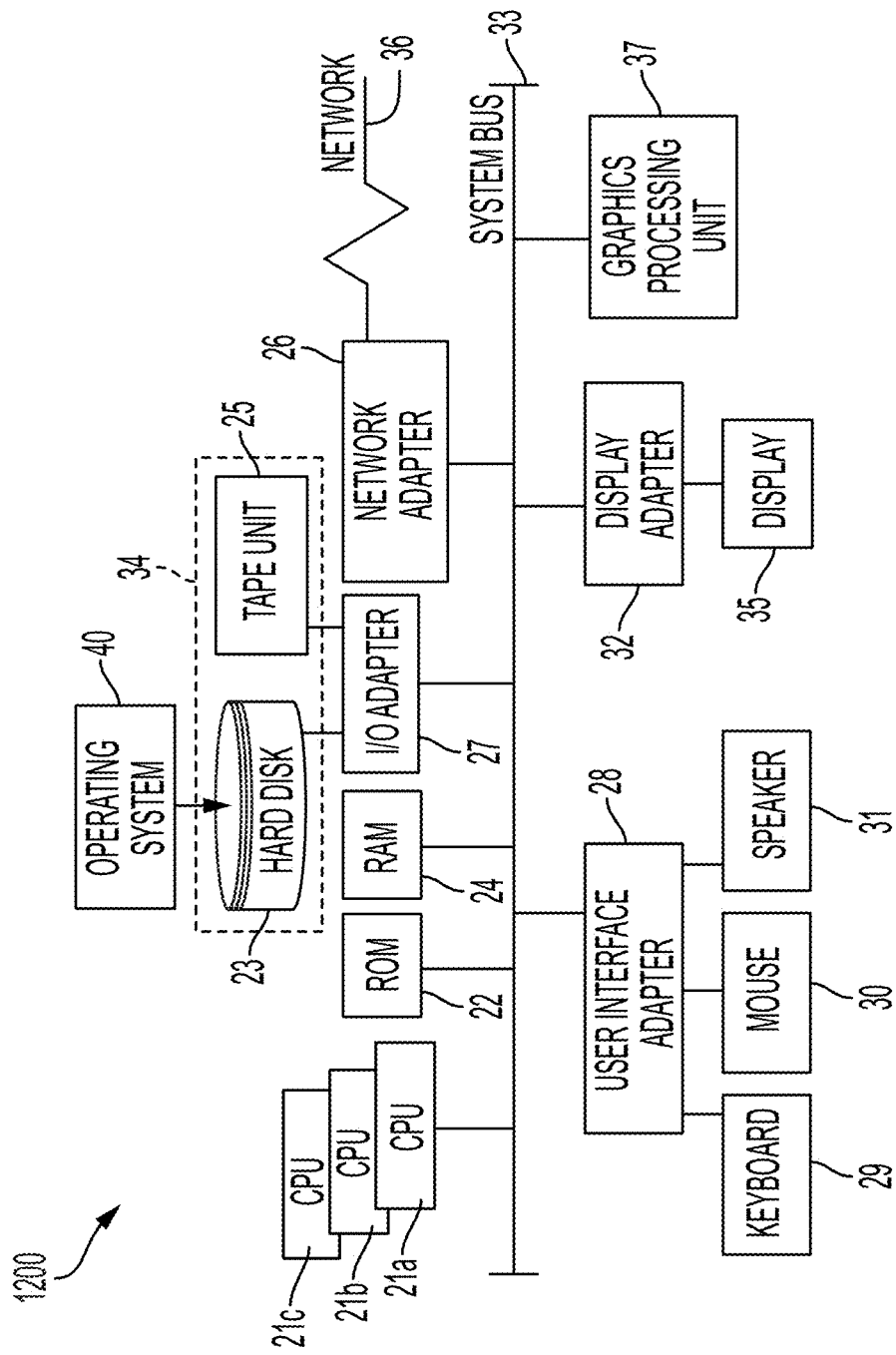
FIG. 12 depicts a processing system for implementing one or more embodiments of the present invention.

It is understood that one or more embodiments of the present invention are capable of being implemented in conjunction with any other type of computing environment now known or later developed. For example, FIG. 12 depicts a block diagram of a processing system 1200 for implementing the techniques described herein. The processing system 1200 is an example of a computing node 10 of FIG. 10. In the embodiment shown in FIG. 12, processing system 1200 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 1200.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 1200 can be stored in mass storage 34. The RAM 24, ROM 22, and mass storage 34 are examples of memory 19 of the processing system 1100. A network adapter 26 interconnects system bus 33 with an outside network 36 enabling the processing system 1200 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 1100 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 1200 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 1200.

In accordance with one or more embodiments of the present invention, all or a subset of the processing described herein is performed by one or more computing node(s) 10 of FIG. 10.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, include the module and achieve the stated purpose for the module.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
receiving a request from a requestor to reclaim a portion of a memory assigned to a virtual machine (VM), the memory comprising real memory divided into a plurality of increments;
in response to receiving the request, predicting an amount of paging space that would be occupied by the VM if the portion of the memory is reclaimed;
based on the predicted amount of paging space exceeding a threshold, notifying the requestor that the portion of the memory cannot be reclaimed; and
based on the predicted amount of paging space not exceeding the threshold, initiating a reclamation of the portion of the memory, the reclamation comprising vacating an increment of the plurality of increments and removing an assignment of the increment to the VM so that it can be used by another VM.

2. The method of claim 1, wherein the predicting is based at least in part on a size of the paging space and an amount of the paging space that is currently occupied.

3. The method of claim 2, wherein the predicting is further based at least in part on a current paging rate of the VM.

4. The method of claim 1, further comprising, prior to the reclamation of the portion of the memory completing:
updating the predicted amount of paging space that will be occupied by the VM subsequent to reclaiming the portion of the memory; and
based on the updated predicted amount of paging space exceeding the threshold, halting the reclamation.

5. The method of claim 4, wherein the updating is performed periodically prior to the reclamation of the portion of the memory completing.

6. The method of claim 4, wherein the portion is specified as a number of increments and the updating is performed prior to vacating an additional increment of the plurality of increments.

7. The method of claim 1, wherein the threshold is a user defined threshold included in the request.

8. The method of claim 1, wherein the vacating comprises:
moving contents of the increment to existing free space on other increments of the plurality of increments; and
based on consuming all of the existing free space on the other increments, moving remaining contents of the increment to the paging space.

9. The method of claim 1, wherein the threshold is maximum paging percentage.

10. A system comprising:
a memory having computer readable instructions; and
one or more processors for executing the computer readable instructions, the computer readable instructions controlling the one or more processors to perform operations comprising:
receiving a request from a requestor to reclaim a portion of a memory assigned to a virtual machine (VM), the memory comprising real memory divided into a plurality of increments;
in response to receiving the request, predicting an amount of paging space that would be occupied by the VM if the portion of the memory is reclaimed;
based on the predicted amount of paging space exceeding a threshold, notifying the requestor that the portion of the memory cannot be reclaimed; and
based on the predicted amount of paging space not exceeding the threshold, initiating a reclamation of the portion of the memory, the reclamation comprising vacating an increment of the plurality of increments and removing an assignment of the increment to the VM so that it can be used by another VM.

11. The system of claim 10, wherein the predicting is based at least in part on a size of the paging space and an amount of the paging space that is currently occupied.

12. The system of claim 11, wherein the predicting is further based at least in part on a current paging rate of the VM.

13. The system of claim 10, wherein the operations further comprise, prior to the reclamation of the portion of the memory completing:
updating the predicted amount of paging space that will be occupied by the VM subsequent to reclaiming the portion of the memory; and
based on the updated predicted amount of paging space exceeding the threshold, halting the reclamation.

14. The system of claim 13, wherein the updating is performed periodically prior to the reclamation of the portion of the memory completing.

15. The system of claim 13, wherein the portion is specified as a number of increments and the updating is performed prior to vacating an additional increment of the plurality of increments.

16. The system of claim 10, wherein the threshold is a user defined threshold included in the request.

17. The system of claim 10, wherein the vacating comprises:
moving contents of the increment to existing free space on other increments of the plurality of increments; and
based on consuming all of the existing free space on the other increments, moving remaining contents of the increment to the paging space.

18. The system of claim 10, wherein the threshold is maximum paging percentage.

19. A computer program product comprising a computer readable storage medium having program instructions embodied therewith, the program instructions executable by a processor to cause the processor to perform operations comprising:
receiving a request from a requestor to reclaim a portion of a memory assigned to a virtual machine (VM), the memory comprising real memory divided into a plurality of increments;

in response to receiving the request, predicting an amount of paging space that would be occupied by the VM if the portion of the memory is reclaimed;

based on the predicted amount of paging space exceeding a threshold, notifying the requestor that the portion of the memory cannot be reclaimed; and based on the predicted amount of paging space not exceeding the threshold, initiating a reclamation of the portion of the memory, the reclamation comprising vacating an increment of the plurality of increments and removing an assignment of the increment to the VM so that it can be used by another VM.

20. The computer program product of claim 19, wherein the operations further comprise, prior to the reclamation of the portion of the memory completing:

updating the predicted amount of paging space that will be occupied by the VM subsequent to reclaiming the portion of the memory; and based on the updated predicted amount of paging space exceeding the threshold, halting the reclamation.

* * * * *